United States Patent
Dufour et al.

(10) Patent No.: US 10,550,238 B2
(45) Date of Patent: Feb. 4, 2020

(54) MONOLITHIC, SUPER HEAT-INSULATING, ORGANIC AEROGEL COMPOSITION PREPARATION METHOD, SAID COMPOSITION, AND THE USE THEREOF

(71) Applicant: HUTCHINSON, Paris (FR)

(72) Inventors: Bruno Dufour, Champange sur Seine (FR); Benjamin Swoboda, Bois le Roi (FR); Cedric Huillet, Montargis (FR); Florian Fannechere, Chalette sur Loing (FR); Nadine Poupa, Dordive (FR)

(73) Assignee: HUTCHINSON, Paris (FR)

( * ) Notice: Subject to any disclaimer, the term of this patent is extended or adjusted under 35 U.S.C. 154(b) by 575 days.

(21) Appl. No.: 15/302,431

(22) PCT Filed: Apr. 11, 2014

(86) PCT No.: PCT/FR2014/050892
§ 371 (c)(1),
(2) Date: Oct. 6, 2016

(87) PCT Pub. No.: WO2015/155423
PCT Pub. Date: Oct. 15, 2015

(65) Prior Publication Data
US 2017/0022345 A1 Jan. 26, 2017

(51) Int. Cl.
*C08J 9/28* (2006.01)
*B01J 13/00* (2006.01)
*C08J 9/00* (2006.01)
*F16L 59/02* (2006.01)

(52) U.S. Cl.
CPC .............. *C08J 9/28* (2013.01); *B01J 13/0091* (2013.01); *C08J 9/0061* (2013.01); *F16L 59/028* (2013.01); *C08J 2205/026* (2013.01); *C08J 2361/12* (2013.01)

(58) Field of Classification Search
CPC ........ C08J 9/28; C08J 2361/04; C08J 9/0061; C08J 2205/026; B01J 13/0091; C08G 2101/00
See application file for complete search history.

(56) References Cited

U.S. PATENT DOCUMENTS 5,420,168 A 5/1995 Mayer et al.

FOREIGN PATENT DOCUMENTS

WO 94/22943 A1 10/1994

OTHER PUBLICATIONS

Peikolainen, "Preparation of Low Density Aerogels from Technical Mixture of Diphenolic Compounds." Jan. 1, 2008. (Year: 2008).*
M. M. Bruno, et al., "A novel way to maintain resorcinol-formaldehyde porosity during drying: Stabilization of the sol-gel nanostructure using a cationic polyelectrolyte," Colloids and Surfaces A: Physicochemical and Engineering Aspects, vol. 362, 2010, pp. 28-32, XP027046589.
T. Chaijitrsakool, et al., "Effects of pore characters of mesoporous resorcinol-formaldehyde carbon gels on enzyme immobilization," Journal of Molecular Catalysis B: Enzymatic, vol. 55, 2008, pp. 137-141, XP025433300.
International Search Report dated Dec. 16, 2014, in PCT/FR14/050892 filed Apr. 11, 2014.

* cited by examiner

*Primary Examiner* — Kara B Boyle
(74) *Attorney, Agent, or Firm* — Oblon, McClelland, Maier & Neustadt, L.L.P.

(57) ABSTRACT

The invention relates to a process for preparing a gelled, dried composition forming a monolithic aerogel with a heat conductivity of less than or equal to 40 $mW \cdot m^{-1} \cdot K^{-1}$ and derived from a resin of polyhydroxybenzene(s) and formaldehyde(s), to this aerogel composition and to the use thereof. This process comprises:
a) polymerization in an aqueous solvent of said polyhydroxybenzene(s) and formaldehyde(s) in the presence of an acidic or basic catalyst, to obtain a solution based on the resin,
b) gelation of the solution obtained in a) to obtain a gel of the resin, and
c) drying of the gel to obtain a dried gel.
According to the invention, step a) is performed in the presence of a cationic polyelectrolyte dissolved in this solvent, and the process also comprises a step d) of heat treatment under inert gas of the dried gel obtained in step c) at temperatures of between 150° C. and 500° C. to obtain the non-pyrolyzed aerogel whose heat conductivity is substantially unchanged, even after exposure to a humid atmosphere.

10 Claims, No Drawings

MONOLITHIC, SUPER HEAT-INSULATING, ORGANIC AEROGEL COMPOSITION PREPARATION METHOD, SAID COMPOSITION, AND THE USE THEREOF

The present invention relates to a process for preparing a gelled, dried and non-pyrolyzed composition forming a thermally super-insulating organic monolithic aerogel, to such an aerogel composition and to the use of this composition. The invention applies to non-pyrolyzed organic aerogels of very low density and of high specific surface area and high pore volume, for use thereof as thermally super-insulating materials (i.e. typically having a heat conductivity of less than or equal to 40 mW·m$^{-1}$·K$^{-1}$ approximately).

Aerogels are porous materials obtained after gelation and then drying of a gel, in which the liquid serving as solvent has been replaced with a gas or a gaseous mixture. Organic aerogels are very promising for use as heat insulators, due to the fact that they have heat conductivities that may be only 0.012 W·m$^{-1}$·K$^{-1}$, i.e. close to those obtained with silica aerogels (0.010 W·m$^{-1}$·K$^{-1}$). Specifically, they are highly porous (being both microporous and mesoporous) and have a high specific surface area and a high pore volume. Silica aerogels are typically in powder form, and have the major drawback of releasing silica nanoparticles, which poses a toxicity problem. However, organic aerogels may be obtained in the form of monoliths, which makes them more readily manipulable for use in buildings.

Organic aerogels with a high specific surface area are typically prepared from a resorcinol-formaldehyde (abbreviated as RF) resin. These resins are particularly advantageous for obtaining aerogels, since they are inexpensive, may be used in water and make it possible to obtain various porosities and densities as a function of the preparation conditions (ratios between reagents, choice of catalyst, etc.).

Furthermore, these aerogels may be pyrolysed in the form of porous carbon with a high specific surface area, having the advantage of absorbing infrared radiation and thus of having low heat conductivity at high temperature.

However, the gel formed by such an RF resin is usually an irreversible chemical gel, obtained by polycondensation of the precursors and which can no longer be used. Furthermore, at high conversion, this gel becomes hydrophobic and precipitates, which leads to mechanical stresses in the material and thus to greater fragility. Thus, for a low density of material, it is necessary to use a water drying method that is mild enough to avoid fracturing or contraction of the gel structure and a loss of specific surface area. This typically involves a solvent exchange with an alcohol followed by drying with a supercritical fluid such as $CO_2$, as described in document U.S. Pat. No. 4,997,804, or freeze-drying, these techniques having the drawback of being complex and expensive.

Furthermore, RF gels have the drawback of being hydrophilic at the surface and of absorbing water after exposure to ambient air, especially when it is relatively humid. Since water is a good heat conductor, the insulating properties of RF gels thus degrade over time.

Another drawback of RF gels is that they absorb infrared rays sparingly. Now, at high temperature, heat conduction by infrared radiation is substantial, which penalizes the heat insulation afforded by these gels. In order to improve the heat resistance at high temperature of RF gels, it was sought in the past to incorporate therein an absorbent additive that is capable of preventing conduction by infrared radiation, such as carbon black. However, in the case of a monolithic RF aerogel, it is difficult to incorporate homogeneously such an infrared absorbent into the aerogel due to the fact that the latter is not in powder form.

One aim of the present invention is to propose a process for preparing a gelled, dried and non-pyrolyzed organic composition that can overcome all of the abovementioned drawbacks by forming an organic monolithic aerogel of low density and of high specific surface area which has a thermally super-insulating property that is stable over time, while at the same time being obtained via a process that is simple and thus inexpensive.

This aim is achieved in that the Applicant has just discovered, surprisingly, that the addition in the aqueous phase, to precursors of a resin of polyhydroxybenzene(s) and formaldehyde(s) type, of a particular family of additives consisting of a water-soluble cationic polyelectrolyte to obtain a solution of the resin, followed by gelation of this solution, oven-drying of the gel obtained and then heat treatment under an inert gas without pyrolysis of the dried gel, makes it possible to obtain a partly carbonized aerogel that has both very low heat conductivity even at high temperature and low water uptake, giving it durably low heat conductivity, and being able to dispense with drying by solvent exchange and with supercritical fluid.

More precisely, a process according to the invention for preparing a gelled, dried composition forming an organic monolithic aerogel with a heat conductivity of less than or equal to 40 mW·m$^{-1}$·K$^{-1}$ and at least partly derived from a resin obtained by polycondensation of polyhydroxybenzene(s) R and formaldehyde(s) F, comprises:
a) polymerization in an aqueous solvent W of said polyhydroxybenzene(s) R and formaldehyde(s) F in the presence of an acidic or basic catalyst, to obtain a solution based on said resin,
b) gelation of this solution to obtain a gel of said resin, and
c) drying of the gel obtained in b) to obtain a dried gel.

This process of the invention is such that step a) is performed in the presence of at least one water-soluble cationic polyelectrolyte P dissolved in said solvent W, and it also comprises a step d) of heat treatment under inert gas of the dried gel obtained in step c) at temperatures of between 150° C. and 500° C. to obtain the non-pyrolyzed aerogel whose heat conductivity is substantially unchanged, even after prolonged exposure to a humid atmosphere.

The term "gel" means, as is known, the mixture of a colloidal material and of a liquid, which forms spontaneously or under the action of a catalyst by flocculation and coagulation of a colloidal solution.

The term "water-soluble polymer" means a polymer that can be dissolved in water without adding additives (especially surfactants), unlike a water-dispersible polymer, which is capable of forming a dispersion when it is mixed with water.

It will be noted that this post-drying heat treatment according to the invention should not be confused with pyrolysis of the aerogel (which by definition is a total carbonization of the aerogel usually performed at a temperature above 600° C., typically at least 800° C.), due to the heating temperatures used in this treatment of the invention, which are not more than 500° C.

Advantageously, this heat treatment makes it possible, unexpectedly, to improve the stability of the heat-insulating properties of the aerogel, with its heat conductivity barely increasing even under an atmosphere characterized by a high degree of relative humidity, for example of more than 60%.

It will also be noted that a composition according to the invention incorporating this cationic polyelectrolyte P may advantageously be obtained by using in step c) oven drying, which is much simpler to perform and less penalizing on the production cost of the aerogel than solvent exchange and drying with supercritical fluid. Specifically, the Applicant has discovered that this polyelectrolyte P makes it possible to conserve the high porosity of the gel obtained after this oven drying and to give it a very low density combined with a high specific surface area and a high pore volume.

According to another characteristic of the invention, said dried gel obtained in step c) has a core and a surface layer that may both comprise oxygenated groups, only a part of which is carbonized in the heat treatment step d), the aerogel obtained after this step d) presenting said oxygenated groups intact in said core and said surface layer.

It will be noted that this only partial carbonization of the oxygenated groups of the aerogel, which is manifested by an absence of carbonization of a significant part of these oxygenated groups especially at the core of the aerogel, bears witness to this difference with respect to the usual pyrolysis treatments that are not performed in the present invention.

Advantageously, said aerogel obtained after step d) may bear, as said intact oxygenated groups, hydroxyl groups and/or formaldehyde groups.

According to a preferential embodiment of the invention, step d) comprises at least one temperature increase followed by at least one heat stabilization stage, and ends with gradual cooling to a temperature of between 15 and 30° C.

Preferably, step d) successively comprises:
  a first said temperature increase at a rate of between 1 and 5° C./minute up to an intermediate temperature of between 100 and 200° C., followed by a first stabilization stage at said intermediate temperature lasting between 5 and 30 minutes,
  a second said temperature increase at a rate of between 2 and 10° C./minute up to a final temperature of between 240 and 460° C., followed by a second stabilization stage at said final temperature lasting between 1 hour and 3 hours, and then
  said gradual cooling for a time of at least 45 minutes to a temperature of between 20 and 25° C.

Also preferentially, use is made in step a) of said at least one cationic polyelectrolyte P in a mass fraction in said composition of between 0.2% and 2%.

Said at least one cationic polyelectrolyte P may be any cationic polyelectrolyte that is totally water-soluble and that has a low ionic strength.

Even more preferentially, use is made in step a) for said at least one cationic polyelectrolyte P of an organic polymer chosen from the group consisting of quaternary ammonium salts, poly(vinylpyridinium chloride), poly(ethyleneimine), poly(vinylpyridine), poly(allylamine hydrochloride), poly (trimethylammonium chloride ethylmethacrylate), poly (acrylamide-co-dimethylammonium chloride) and mixtures thereof, and preferably a salt comprising units derived from a quaternary ammonium chosen from poly(diallyldimethylammonium halides).

Even more preferentially, it is poly(diallyldimethylammonium chloride) or poly(diallyldimethylammonium bromide).

Advantageously, step a) may be performed at a temperature of between 15 and 30° C., by dissolving the polyhydroxybenzene(s) R and said at least one polyelectrolyte P in said aqueous solvent W preferably consisting of water, followed by adding to the solution obtained said formaldehyde(s) F and said acidic or basic catalyst.

Among the polymers that are precursors of said resin, which may be used in the present invention, mention may be made of polymers resulting from the polycondensation of at least one monomer of polyhydroxybenzene type R and of at least one formaldehyde monomer F. This polymerization reaction may involve more than two different monomers, additional monomers being or not being of the polyhydroxybenzene type. The polyhydroxybenzenes R that may be used are preferentially di- or tri-hydroxybenzenes and advantageously resorcinol (1,3-dihydroxybenzene) or a mixture of resorcinol with another compound chosen from catechol, hydroquinone and phloroglucinol.

As catalyst that may be used in step a), examples that may be mentioned include acidic catalysts such as aqueous solutions of hydrochloric, sulfuric, nitric, acetic, phosphoric, trifluoroacetic, trifluoromethane-sulfonic, perchloric, oxalic, toluenesulfonic, dichloroacetic or formic acid, or alternatively basic catalysts such as sodium carbonate, sodium hydrogen carbonate, potassium carbonate, ammonium carbonate, lithium carbonate, aqueous ammonia, potassium hydroxide and sodium hydroxide.

Advantageously, use may be made in step a) of the polyhydroxybenzene(s) R and formaldehyde(s) F in an R/F mole ratio of between 0.3 and 0.7.

Also advantageously, use may be made in step a) of an R/W mass ratio between polyhydroxybenzene(s) R and aqueous solvent W of between 0.001 and 0.07.

According to another characteristic of the invention, at least one filler that is capable of absorbing infrared radiation, such as a carbon black, may be added to said solution obtained in a), before step b).

A gelled, dried and non-pyrolyzed composition according to the invention forms an organic monolithic aerogel with a heat conductivity of less than or equal to 40 mW·m$^{-1}$·K$^{-1}$, and it may be obtained via said process of the invention.

This composition is based on a resin at least partly derived from polyhydroxybenzene(s) R and formaldehyde(s) F, and it advantageously comprises the product of a polymerization reaction in an aqueous solvent W of said polyhydroxybenzene(s) R and formaldehyde(s) F, in the presence of said at least one cationic polyelectrolyte P dissolved in this solvent and of an acidic or basic catalyst.

According to the invention, this composition comprises at least one water-soluble cationic polyelectrolyte P, and it has said heat conductivity which increases by less than 10% and by less than 20%, respectively, after 1 hour and 2 hours of exposure to a humid atmosphere regulated at 20° C. and 65% relative humidity, said heat conductivity being measured with a Neotim conductimeter via the hot wire technique according to standard ASTM D5930-97 and also preferably according to the RILEM recommendation AAC 11-3.

Advantageously, said heat conductivity may be less than or equal to 30 mW·m$^{-1}$·K$^{-1}$ and even more advantageously less than or equal to 26 mW·m$^{-1}$·K$^{-1}$, after these 2 hours of exposure to said humid atmosphere.

Also advantageously, the composition may have a mass proportion of water uptake of less than 3% and 5%, respectively, after 1 and 2 hours of exposure to said humid atmosphere.

According to another characteristic of the invention, said aerogel has a core and a surface layer that may both comprise oxygenated groups. More precisely, this aerogel may have a polymeric structure essentially based on a repeating unit that may comprise an aromatic nucleus to which are bonded at least one alkyl group and several said oxygenated groups comprising at least one hydroxyl group and/or at least one formaldehyde group.

Advantageously, said composition according to the invention may comprise at least one filler that is capable of absorbing infrared radiation, such as a carbon black.

According to another characteristic of the invention, said aerogel may emit a total concentration of volatile organic compounds (VOC), measured in an emission test chamber according to standard NF ISO 16006-6 of 2005 with specimens prepared according to standard NF EN ISO 16000-11 and conditioned according to standard NF EN ISO 16000-9, which:

after 3 days of exposure in said test chamber, is less than 100 µg·m$^{-3}$ and advantageously less than 40 µg·m$^{-3}$, and/or which after 28 days of exposure in said test chamber, is less than 40 µg·m$^{-3}$ and advantageously less than 10 µg·m$^{-3}$.

According to another characteristic of the invention, said aerogel may emit a concentration of formaldehyde, measured in an emission test chamber according to standard NF ISO 16006-3 of 2002 with specimens prepared according to standard NF EN ISO 16000-11 and conditioned according to standard NF EN ISO 16000-9, which:

after 3 days of exposure in said test chamber, is less than 20 µg·m$^{-3}$ and advantageously less than 5 µg·m$^{-3}$, and/or which after 28 days of exposure in said test chamber, is less than 20 µg·m$^{-3}$ and advantageously less than 5 µg·m$^{-3}$.

Advantageously, said composition according to the invention may have a specific surface area between 400 m$^2$/g and 1200 m$^2$/g and a density of between 0.04 and 0.2.

According to another aspect of the invention, said gelled, dried and non-pyrolyzed composition as defined above is used in a nonlimiting manner for the heat insulation of buildings, of industrial appliances especially for the mechanical or chemical industries, and of land, railway, maritime, waterway, aerial or space vehicles.

It will be noted that the minimized emission, by virtue of said aerogel composition according to the invention, of volatile organic compounds (VOC) and especially of highly toxic compounds such as formaldehydes, may solve the essential technical problem in the building sector of undesirable emissions of these VOCs and in particular of formaldehydes.

Other characteristics, advantages and details of the present invention will emerge on reading the following description of several implementation examples of the invention, which are given as nonlimiting illustrations.

The examples that follow illustrate the preparation of three organic monolithic aerogels AG1, AG2 and AG3 according to the invention, obtained, respectively, via different partial carbonization heat treatments in accordance with the invention following their drying, in comparison with a "control" aerogel AG0 lacking this post-drying heat treatment.

Each aerogel AG0, AG1, AG2 and AG3 was prepared using the following starting reagents to obtain the same solution based on an RF resin:

resorcinol (R) from Acros Organics, 98% pure,
formaldehyde (F) from Acros Organics, 37% pure,
a catalyst (C) consisting of hydrochloric acid, and
poly(diallyldimethylammonium chloride) (P), 35% pure (as a solution in water W).

Table 1 below shows the ratios, mass fraction and pH used to obtain the initial solution of RF resin which is the source of each aerogel AG0, AG1, AG2, AG3:

R/F is the mole ratio between resorcinol and formaldehyde,
R/W is the mass ratio between resorcinol and water, and
P denotes the mass fraction of polyelectrolyte.

TABLE 1

| Amounts of reagents/process | AG0 | AG1 | AG2 | AG3 |
| --- | --- | --- | --- | --- |
| R/F | 0.5 | 0.5 | 0.5 | 0.5 |
| R/W | 0.03 | 0.03 | 0.03 | 0.03 |
| P | 0.4% | 0.4% | 0.4% | 0.4% |
| pH | 1.5 | 1.5 | 1.5 | 1.5 |
| Drying method | oven | oven | oven | oven |

The aerogels AG0, AG1, AG2 and AG3 were prepared as follows.

To perform said step a) for obtaining each solution based on RF resin, the resorcinol R and the polyelectrolyte P were dissolved, in a first stage, in a container containing water W. Next, after total dissolution, the formaldehyde F was added. The polymer solution obtained was adjusted to the appropriate pH (1.5) with the catalyst C, it being pointed out that all these operations were performed at room temperature (at about 22° C.) and that it is possible to add to the solution obtained carbon black as filler for absorbing UV radiation.

To perform said gelation step b), the solution obtained was transferred in a second stage into Teflon® molds, which were then placed in an oven at 90° C. for 24 hours to obtain each gel G0, G1, G2 and G3.

To perform said step c), each gel obtained in b) was crosslinked in a chamber at 85° C. for 24 hours, and each crosslinked gel was then dried at 105° C. in an oven for 24 hours to obtain the "control" aerogel AG0 and the dried gels G1, G2 and G3 to be heat-treated.

To perform step d) according to the invention applied only to the three gels G1, G2 and G3 thus dried, these three gels were subjected, respectively, to three heat treatments performed under a stream of nitrogen (with the same nitrogen flow rate of 0.5 L/minute) but at three different final heating temperatures leading to three degrees of partial carbonization of the aerogels AG1, AG2 and AG3 obtained.

More precisely, step d) leading to the aerogels AG1, AG2 and AG3 was performed according to the following heating program:

a first temperature increase at 2° C./minute up to an intermediate temperature of 150° C., followed by a first stabilization stage of 15 minutes at this intermediate temperature, a second temperature increase at 5° C./minute up to a variable final temperature (of 250° C. for AG1, 350° C. for AG2 and 450° C. for AG3), followed by a second stabilization stage of 2 hours at this final temperature, and then gradual cooling over about 1 hour to a temperature of 22° C.

In order to measure the heat conductivity and the mass proportion of water uptake of the aerogel samples AG0, AG1, AG2 and AG3, these samples were dried overnight under vacuum at 105° C.

The heat conductivity of these samples AG0, AG1, AG2 and AG3 at 22° C. was measured with a Neotim conductimeter via the hot wire technique according to standard ASTM D5930-97 and the RILEM recommendation AAC 11-3. The room used was a room with an atmosphere of regulated temperature (20° C.) and regulated humidity (65% relative humidity). As may be seen in Table 2 below, the following were measured, respectively, at the initial time $t_0$ (before exposure to this humid atmosphere), after 1 hour (time $t_{1h}$) and after 2 hours (time $t_{2h}$) of exposure to this humid atmosphere:
the mass proportion of water uptake of the aerogels AG0, AG1, AG2 and AG3 (mass proportion obtained conventionally via the difference in masses of each aerogel before and after water adsorption, divided by the initial mass of the aerogel), and
the heat conductivity of these aerogels.

In order to quantify the emissions of volatile organic compounds (VOC) of the aerogel samples AG0, AG1, AG2 and AG3, these emissions were measured in an emission test chamber at two times $t_{3d}$ and $t_{28d}$, respectively, after exposure for 3 days and 28 days in this chamber, with specimens formed from these aerogels, prepared according to standard NF EN ISO 16000-11 and conditioned according to standard NF EN ISO 16000-9.

These analyses were performed according to standard NF ISO 16006-6 (2005) for the measurement of the total amount of VOC emitted, and standard NF ISO 16006-3 (2002) for the measurement of the amount of formaldehyde emitted.

Table 2 below compares the emissions of VOC and of formaldehyde obtained at these two times $t_{3d}$ and $t_{28d}$, in addition to density, heat conductivity and water uptake measurements for the aerogel samples AG0, AG1, AG2 and AG3.

TABLE 2

|  | Aerogels | | | |
| --- | --- | --- | --- | --- |
|  | AG0 | AG1 | AG2 | AG3 |
| Density | 0.08 | 0.08 | 0.08 | 0.08 |
| Mass proportion of water uptake at $t_{1\,h}$ | 4.5% | 2.9% | 2.4% | 2.2% |
| Mass proportion of water uptake at $t_{2\,h}$ | 5.8% | 4.2% | 3.4% | 2.9% |
| Heat conductivity at $t_0$ (mW·m$^{-1}$·K$^{-1}$) | 23 | 24 | 23 | 23 |
| Heat conductivity at $t_{1\,h}$ (mW·m$^{-1}$·K$^{-1}$) | 28 | 23 | 24 | 25 |
| Heat conductivity at $t_{2\,h}$ (mW·m$^{-1}$·K$^{-1}$) | 29 | 26 | 26 | 26 |
| Total concentration of VOC at $t_{3\,d}$ (µg·m$^{-3}$) | 1106 | 29 | not measured | not measured |
| Total concentration of VOC at $t_{28\,d}$ (µg·m$^{-3}$) | 48 | 7 | not measured | not measured |
| Total concentration of formaldehyde at $t_{3\,d}$ (µg·m$^{-3}$) | 116 | <3 | not measured | not measured |
| Total concentration of formaldehyde at $t_{28\,d}$ (µg·m$^{-3}$) | 118 | <3 | not measured | not measured |

As seen in this Table 2, the heat treatments under inert gas of the invention make it possible essentially:
to decrease significantly the water uptake of the aerogels AG1, AG2 and AG3 in comparison with the aerogel AG0 obtained without this heat treatment (see the proportions of water uptake after 1 hour or 2 hours, which are virtually halved for AG2 and AG3 relative to AG0), and
to obtain satisfactory stability of the heat conductivity of aerogels AG1, AG2 and AG3 over time in comparison with aerogel AG0 whose heat conductivity markedly increased under a humid atmosphere: see the conductivity increase of more than 21% after 1 hour and of more than 26% after 2 hours of exposure for AG0, whereas AG1, AG2 and AG3 undergo a conductivity increase of only 13% after 2 hours of exposure (i.e. halved relative to AG0) with, especially, an increase of less than 9% for AG1, and even a 4% decrease in conductivity for AG1 after 1 hour of exposure (AG1 thus being a preferential aerogel according to the invention).

Furthermore, Table 2 shows that these heat treatments according to the invention make it possible to decrease very substantially the emissions of volatile organic compounds and in particular of formaldehyde by the aerogels AG1, AG2 and AG3 relative to AG0, which makes these aerogels according to the invention much more suited as thermal super-insulators in the building sector.

Specifically, ratios of about 38 and 7 were observed total emission of VOC, respectively, after 3 days and days of exposure, with concentrations of VOC at these two times that are reduced and entirely acceptable in the building sector. Similarly, ratios of about 40 were observed between this same aerogel AG1 and AG0, for the emission of formaldehyde, respectively, after 3 days and 28 days of exposure, also with very low concentrations of formaldehyde (less than 3 µg·m$^{-3}$) at these two times.

The Applicant moreover confirmed that each aerogel AG1, AG2 and AG3 according to the invention had at the surface and at the core a polymeric structure substantially based on a repeating unit with an aromatic nucleus bearing 6 carbon atoms to which are successively bonded a hydrogen atom, an alkyl group of formula $CH_2$, a first hydroxyl group OH, a first formaldehyde group $CH_2$—O, a second OH group and a second $CH_2$—O group, such that the aerogels AG1, AG2 and AG3 each globally had the following chemical formula (with the exception of certain carbonized hydroxyl and formaldehyde groups):

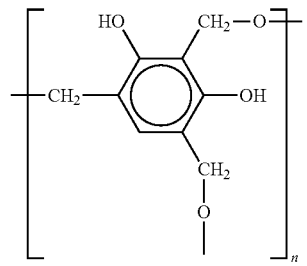

The invention claimed is:
1. A process for preparing a gelled, dried and non-pyrolyzed composition forming an organic monolithic aerogel with a heat conductivity of less than or equal to 40 mW·m−1·K−1, the composition being at least partly derived from a resin obtained by polycondensation of at least one polyhydroxybenzene R and at least one formaldehyde F, the process comprising:
a) polymerizing the at least one polyhydroxybenzene R and the at least one formaldehyde in an aqueous solvent W in the presence of an acidic or basic catalyst, to obtain a solution based on the resin;
b) gelling the solution to obtain a gel of the resin; and
c) drying the gel to obtain a dried gel,
wherein:
the polymerizing a) is performed in the presence of at least one water-soluble cationic polyelectrolyte P dissolved in aqueous solvent W; and
the process further comprises a step d) of heat treating the dried gel under an inert gas at temperatures of between

150° C. and 500° C. to obtain the gelled, dried and non-pyrolyzed composition.

2. The process of claim 1, wherein the dried gel has a core and a surface layer which both comprise oxygenated groups, which are only partially carbonized in the heat treating, such that the gelled, dried and non-pyrolyzed composition comprises several said oxygenated groups which are intact in the core and in the surface layer.

3. The process of claim 2, wherein the gelled, dried and non-pyrolyzed composition comprises hydroxyl groups, formaldehyde groups, or both, as the oxygenated groups.

4. The process of claim 1, wherein the heating treating d) comprises at least one temperature increase followed by at least one heat stabilization stage, and ends with gradual cooling to a temperature of between 15 and 30° C.

5. The process of claim 4, wherein the heat treating d) comprises:
a first temperature increase at a rate of between 1 and 5° C./minute up to an intermediate temperature of between 100 and 200° C., followed by a first stabilization stage at the intermediate temperature lasting between 5 and 30 minutes;
a second temperature increase at a rate of between 2 and 10° C./minute up to a final temperature of between 240 and 460° C., followed by a second stabilization stage at the final temperature lasting between 1 hour and 3 hours; and then
said gradual cooling for a time of at least 45 minutes to a temperature of between 20 and 25° C.

6. The process of claim 1, wherein the at least one water-soluble cationic polyelectrolyte P used during the polymerizing a) is present in the gelled, dried and non-pyrolyzed composition at a mass fraction of between 0.2% and 2% relative to a total mass of the composition.

7. The process of claim 1, wherein the at least one water-soluble cationic polyelectrolyte P is an organic polymer selected from the group consisting of an organic quaternary ammonium salt, a poly(vinylpyridine chloride), a poly(ethyleneimine), a poly(vinylpyridine), a poly(allylamine hydrochloride), a poly(trimethylammonium chloride ethylmethacrylate), a poly(acrylamide-co-dimethylammonium chloride) and mixtures thereof.

8. The process of claim 1, wherein the polymerizing a) occurs at a temperature of between 15 and 30° C., by dissolving the at least one polyhydroxybenzene R and the at least one cationic polyelectrolyte P in the aqueous solvent W, followed by adding to a solution obtained the at least one formaldehyde F and the acidic or basic catalyst.

9. The process of claim 1, wherein, before the gelling b), at least one filler that is capable of absorbing infrared radiation is added to the solution.

10. The process of claim 1, wherein the drying c) is performed by oven drying, the drying c) being performed without solvent exchange and without drying with a supercritical fluid.

* * * * *